they are often used in a particular application.

United States Patent Office 3,414,054
Patented Dec. 3, 1968

3,414,054
SECONDARY RECOVERY OF PETROLEUM BY
SURFACTANT-WATER FLOODING
George G. Bernard, Fullerton, Calif., assignor to Union
Oil Company of California, Los Angeles, Calif., a corporation of California
No Drawing. Filed June 19, 1967, Ser. No. 647,177
14 Claims. (Cl. 166—9)

ABSTRACT OF THE DISCLOSURE

A process for recovering petroleum from a subterranean reservoir by flooding with an aqueous surfactant solution wherein the adsorption of surfactant by the reservoir rock is inhibited by treating the reservoir with pyridine prior to injecting the surfactant. Preferably, treatment is accomplished by injecting an aqueous solution of pyridine into the reservoir in an amount at least sufficient to substantially satisfy the adsorption capacity of the reservoir rock. The pyridine and the surfactant can be displaced through the formation by a subsequently injected aqueous drive fluid.

---

This invention relates to the secondary recovery of petroleum from subterranean reservoirs, and more particularly to an improved method of conducting a surfactant-water flood.

It has long been recognized that the amount of oil recoverable from petroleum reservoirs by primary methods is relatively low, often amounting to less than 50 percent of the original oil in place. Various secondary methods of increasing oil recovery have been proposed, including the well known technique of injecting water into the formation through an injection well to drive additional oil toward one or more production wells spaced apart from the injection well. While this method of water flooding has met with some degree of success, nevertheless a large proportion of the oil is left unrecovered.

More recently, it has been proposed that surface active agents be added to the flood water to reduce the interfacial tension between the reservoir oil and the injected water, thereby promoting displacement of the residual oil by the water. It is preferred that the surfactant be chemically inert and not readily adsorbed by the formation rock. However, most available surfactants are to a greater or less degree adsorbed by the formation rock, and in order to maintain a sufficient concentration of surfactant at the oil-water interface, either the water pumped into the formation must contain an undesirably large concentration of surfactant, or a large quantity of water must be injected before surfactant can be detected in the produced fluids, thereby indicating that the surfactant has contacted as much of the formation as possible.

Moreover, the adsorption of surfactant on the reservoir rock reduces the concentration of surfactant at the leading edge of the flood front, with the result that the surfactant front advances through the reservoir more slowly than the flood front. Therefore, little or no surfactant is present at the interface between the reservoir oil and the injected flood water, and it is at this interface that the presence of surfactant is most desired.

While methods have been proposed that somewhat mitigate the loss of surfactant and increase the rate of advance of the surfactant front through the reservoir, these methods are limited in that they have not been effective in maintaining the surfactant in solution at the leading edge of the flood front. For instance, Newcomb et al. in U.S. Patent 2,748,080 propose the addition of borax to the surfactant solution. While borax increases the rate at which the surfactant is displaced through the formation, and has a beneficial effect on oil recovery, it does not insure that the surfactant is maintained at the oil-water interface. Bernard et al. in U.S. Patent 3,056,452 propose a class of surfactants which are not appreciably adsorbed by the formation. Although these materials can be effective in a particular application, the selection of a surfactant material is limited, and the adsorptivity of a particular surfactant often precludes its use in a flooding process even though the surfactant may otherwise possess highly desirable properties.

Accordingly, it is a principal object of the present invention to provide a method for inhibiting the adsorption of surfactant from an aqueous surfactant solution by an adsorbent solid contacted by the solution. Another object of this invention is to provide an improved surfactant-water flooding process. Another object of this invention is to provide a method of inhibiting the adsorption of surfactant from a surfactant-containing flood water. Another object of the invention is to insure that when flooding a reservoir with a surfactant-containing flood water, the surfactant is available at the oil-water interface. Still another object of this invention is to provide a method for treating a formation to inhibit the adsorption of surfactant from a subsequently injected surfactant-flood water. These and other objects will be apparent to those skilled in the art from the description which follows.

Briefly, this invention contemplates a surfactant-water flooding process for recovering oil from a subterranean petroleum reservoir wherein adsorption of the surfactant by the reservoir rock is inhibited by treating the reservoir with pyridine prior to injecting the surfactant. Treatment of the reservoir rock is accomplished by injecting pyridine, or a pyridine-containing solution, into the reservoir, preferably in at least an amount sufficient to substantially satisfy the adsorption capacity of the reservoir rock. Surfactant, or surfactant-containing solution, is then injected into the reservoir to displace oil and non-adsorbed pyridine through the reservoir. These fluids can be followed by a subsequently injected driving fluid to displace the surfactant and reservoir oil toward a spaced production well.

The oil recovery process of this invention is practiced in a reservoir penetrated by at least one injection well conventionally equipped for the injection of water and at least one production well spaced apart from the injection well. The water injection and production wells can be arranged in any convenient pattern, such as the conventional five-spot or seven-spot patterns, or parallel rows of wells can be used for line drives.

In the practice of this invention, a liquid volume of pyridine is injected through the injection well and into the reservoir. The pyridine can either be injected as a substantially undiluted liquid, or as a solution of pyridine in a suitable solvent. Superior distribution of the pyridine throughout the formation is usually attained by injecting a pyridine solution. Pyridine is readily soluble in most conventional solvents, such as water, alcohols, ketones, ethers, benzene, petroleum oil and refined petroleum oil fractions. Solvents found particularly useful include water, brine, isopropyl alcohol, methylethyl and methylisobutyl ketones, crude oil and light refined petroleum fractions, such as those boiling below about 600° F. When injecting a pyridine solution, it is usually advantageous to employ a pyridine concentration above about 10 weight percent so as to reduce the total volume of liquid that must be injected. Satisfactory distribution and reasonable liquid volumes can usually be attained with pyridine concentrations between about 10 and about 50 volume percent.

While the exact mechanism by which the pyridine acts to increase the oil recovery attained by flooding with surfactant-containing water is not completely understood, it is believed that pyridine has the unusual property of being adsorbed by adsorbent clays and other earth constituents. The adsorbed pyridine apparently inhibits the adsorption of subsequently injected surfactant. While undoubtedly a certain amount of pyridine is desorbed and replaced by surfactant on continued exposure of the surfactant, the exact amount depending on the relative equilibrium values, in the usual case the critical surfactant-oil interface passes through the reservoir sufficiently rapidly that no substantial desorption of the surfactant occurs. However, despite any particular theory of operation, the effectiveness of pretreating the reservoir with pyridine in improving the efficiency of a surfactant-water flood has been clearly demonstrated.

While the injection of any amount of pyridine is to some extent effective in reducing the adsorption of surfactant by the adsorbent earth constituents, it is preferred that sufficient pyridine be injected to effect a substantial reduction in the adsorption of the subsequently injected surfactant. Most preferably, pyridine is injected in at least an amount sufficient to substantially satisfy the adsorption capacity of the reservoir rock in the area subjected to the recovery operation. While excess pyridine can be injected into the formation, substantial excesses are to be avoided since they are wasteful of pyridine and without significant additional benefit. Since the adsorptivity of the reservoir rock will vary, depending primarily on the amount and type of clays encountered, the specific amount of pyridine required to treat a particular reservoir must be correlated with both the areal extent of the zone to be treated and the adsorptivity of the reservoir rock.

The surfactant can be injected immediately following the pyridine or, alternatively, the pyridine can be displaced into the reservoir with an inert fluid prior to injection of the surfactant. The surfactant can be injected into the reservoir in liquid form or, similarly, a solution of the surfactant can be injected. In a surfactant-water flooding operation, it is usually advantageous to inject the surfactant as a dilute aqueous solution. The surfactant solution can be injected throughout the flooding operation, or surfactant injection can be terminated and the injected surfactant displaced through the reservoir by the injection of a spaced fluid such as a conventional aqueous drive fluid. In any case, fluids including oil displaced ahead of the advancing surfactant front are recovered from the production well.

Pretreating the reservoir with pyridine is particularly efficacious in reducing adsorption of anionic and nonionic types of surfactants. Therefore, a preferred embodiment of this invention involves pretreating an earth formation with pyridine prior to injecting an anionic and/or nonionic surfactant into the formation.

In a specific mode of practicing the recovery operation of this invention, an aqueous pyridine solution is first injected into the reservoir, which may or may not have been subjected to prior primary and secondary recovery operations, such as for example conventional water flooding. Preferably, the concentration of pyridine in the injected solution is between about 10 and about 50 volume percent and the solution is injected in an amount at least sufficient to substantially satisfy the adsorption capacity of the reservoir rock in the area of the reservoir in which treatment is desired. Thereafter, a volume of an aqueous solution of a water soluble anionic or nonionic surfactant is injected into the formation and displaced through the formation toward one or more spaced production wells by a subsequently injected aqueous drive fluid. Alternatively, a spacer liquid, such as water or brine, can be injected immediately after the pyridine solution to displace the pyridine solution into the formation prior to injection of the surfactant solution.

While the invention has been primarily described in conjunction with the surfactant-water flooding of an oil-bearing subterranean reservoir, it is to be recognized that the invention is useful in any surfactant treatment of an earth formation to inhibit adsorption of the surfactant by the adsorptive constituents of the formation, and further can be generally employed to inhibit adsorption of surfactant from a surfactant solution in contact with an adsorbent solid.

The improved surfactant-water flooding method of this invention is demonstrated by the following examples which are presented by way of illustration, and are not intended as limiting the spirit and scope of the invention as defined in the appended claims.

The adsorption of surfactant by an adsorbent clay is demonstrated by preparing an aqueous surfactant-clay system of known proportions and analyzing the equilibrium surfactant concentration in the water phase.

In accordance with this procedure, an aqueous surfactant-clay system is prepared by adding 1.0 gram of Aquagel clay, a commercial clay marketed by the Baroid Division of the National Lead Company, and 1.0 ml. of a 1.0 volume percent solution of O.K. Liquid Detergent, a commercial anionic surfactant marketed by the Procter and Gamble Company, to 25 ml. of brine (3% NaCl, 0.3% $CaCl_2$). This surfactant proportion corresponds to a concentration of 0.040 volume percent. After 16 hours of agitation, the concentration of surfactant in the solution is 0.0023 volume percent. Thus, approximately 94 percent of the surfactant is adsorbed by the clay.

*Example 2*

The experiment of Example 1 is repeated, excepting that the clay is first treated with pyridine before being contacted by the surfactant solution.

The clay is treated with pyridine by admixing 1 ml. of pyridine and 1.0 gram of Aquegel clay in 5 ml. of brine. This proportion corresponds to an initial pyridine concentration of 16.7 volume precent. After one hour, 20 ml. of brine and 1.0 ml. of a 1.0 volume percent solution of O.K. Liquid Detergent are added to the treated clay system. This mixture is agitated for 16 hours and the water phase analyzed for surfactant. The concentration of surfactant is found to be 0.038 volume percent, thus indicating that only 5% of the surfactant is adsorbed by the clay.

*Example 3*

The experiment of Example 1 is repeated using Triton X–100, a commercial nonionic surfactant marketed by the Rohm and Haas Company, instead of O.K. Liquid Detergent. After 16 hours of agitation, the concentration of surfactant in the aqueous phase is found to be 0.0012 volume percent.

*Example 4*

The experiment of Example 2 is repeated using Triton X–100 surfactant instead of O.K. Liquid Detergent. After 16 hours of agitation, the concentration of Triton X–100 surfactant in the water phase is found to be 0.039 volume percent, which corresponds to an adsorption of only about 2 percent of the surfactant.

The data resulting from the experiments of Examples 1 through 4 is summarized in Table I.

TABLE I

| Ex. No. | Surfactant | Surfactant concentration of aqueous phase, vol. percent | | Percent surfactant adsorbed by clay |
|---|---|---|---|---|
| | | Untreated | Treated with pyridine | |
| 1 | O.K. liquid detergent | 0.0023 | | 94 |
| 2 | do | | 0.038 | 5 |
| 3 | Triton X–100 | 0.0012 | | 97 |
| 4 | do | | 0.039 | 2 |

*Example 5*

A Berea sandstone core having a diameter of 1½ inches and a length of 2 inches is initially saturated with 0.71 pore volume of crude oil and 0.29 pore volume of brine (3% NaCl solution). The core is then subjected to conventional water flooding with a 3.0 percent sodium chloride solution. After 10 pore volumes of brine are passed through the core, the residual oil saturation is reduced to 0.41 pore volume. Next, 10 pore volumes of a 0.01 percent solution of Triton X–100 surfactant in brine are passed through the core and an additional 0.01 pore volume of oil recovered. Thus, the final oil saturation is 0.40 pore volume, and the net oil recovery 43.6 percent.

*Example 6*

A Berea sandstone core, similar to the core used in Example 5, is initially saturated with 0.70 pore volume of crude oil and 0.30 pore volume of brine. The core is then flooded with 3.0 percent brine. After 10 pore volumes of brine are passed through the core, oil saturation is reduced to 0.40 pore volume. Next, 1.0 pore volume of a 10 volume percent pyridine solution is passed through the core. No additional oil is recovered during this injection. Following the treatment with pyridine, 10 pore volumes of a 0.01 percent soluton of Triton X–100 surfactant in brine are passed through the core and an additional 0.06 pore volume of oil recovered. Final oil saturation is 0.34 pore volume, and the net oil recovery 48.6 percent.

Thus, an additional 5 percent of oil is recovered by treating the core with pyridine prior to the surfactant flood.

Various embodiments and modifications of this inventions are apparent from the foregoing description and examples, and further modifications will be apparent to those skilled in the art. Such modifications are included within the scope of this invention as defined by the following claims:

I claim:
1. In the method of recovering oil from subterranean reservoirs wherein an aqueous flooding medium containing a surfactant adsorbable by the reservoir rock is injected through an input well and fluids are recovered from the reservoir through a spaced production well, the improvement which comprises injecting pyridine into said reservoir prior to the injection of said surfactant.
2. The method defined in claim 1 wherein said pyridine is injected in at least an amount sufficient to substantially satisfy the adsorption capacity of the reservoir rock.
3. The method defined in claim 1 wherein said pyridine is injected in aqueous solution.
4. The method defined in claim 3 wherein the concentration of pyridine in said aqueous pyridine solution is between about 10 and about 50 volume percent.
5. A process for recovering oil from an oil-bearing subterranean reservoir pentrated by at least one injection well and at least one spaced production well, which comprises the steps of:
   (a) injecting pyridine into said reservoir through said injection well in at least an amount sufficient to substantially satisfy the adsorption capacity of the reservoir rock;
   (b) thereafter injecting an aqueous surfactant solution through said injection well;
   (c) driving said surfactant solution through said reservoir with an aqueous driving fluid; and
   (d) recovering fluids from said production well.
6. The process in accordance with claim 5 in which said pyridine is injected in aqueous solution.
7. The process in accordance with claim 6 wherein the concentration of pyridine in said aqueous pyridine solution is between about 10 and about 50 volume percent.
8. A method for inhibiting the adsorption of surfactant from a surfactant solution in contact with an adsorbent solid which comprises treating said absorbent solid with pyridine prior to contacting the solid with said surfactant solution.
9. The method defined in claim 8 wherein said adsorbent solid is treated with pyridine by contacting said solid with pyridine in at least an amount sufficient to substantially satisfy the adsorption capacity of said solid.
10. The method defined in claim 8 wherein said adsorbent solid is treated with pyridine by contacting said solid with an aqueous solution containing between about 10 and about 50 volume percent pyridine.
11. A water flooding process for recovering oil from an oil-bearing subterranean reservoir penetrated by at least one injection well and at least one spaced production well, which comprises:
   injecting an aqueous flooding medium through said injection well and into said formation;
   adding pyridine to a first portion of said aqueous flooding medium;
   adding surfactant to a subsequently injected second portion of said aqueous flooding medium;
   thereafter continuing the injection of said aqueous flooding medium; and
   recovering fluids from said production well.
12. The process defined in claim 11 wherein the concentration of pyridine in said first portion of said aqueous fracturing fluid is between about 10 and about 50 volume percent.
13. The process defined in claim 11 wherein sufficient pyridine is added to said aqueous flooding medium to substantially satisfy the adsorption capacity of the reservoir rock.
14. The process defined in claim 11 wherein a volume of said aqueous flooding medium is injected between said pyridine and said surfactant.

References Cited

UNITED STATES PATENTS

| | | | |
|---|---|---|---|
| 2,748,080 | 5/1956 | Newcombe et al. | 252—8.55 |
| 3,056,452 | 10/1962 | Bernard | 166—4 |
| 3,258,072 | 6/1966 | Froning | 166—9 |
| 3,283,812 | 11/1966 | Ahearn et al. | 166—9 |

JAMES A. LEPPINK, *Primary Examiner.*